US009050534B2

(12) United States Patent  
Ganetakos et al.

(10) Patent No.: US 9,050,534 B2
(45) Date of Patent: Jun. 9, 2015

(54) ACHIEVEMENTS FOR A VIRTUAL WORLD GAME

(75) Inventors: Joseph Benjamin Ganetakos, Toronto (CA); Frank James Caron, Mississauga (CA); Jesse Daniel Scoble, Toronto (CA); Gord Scott McLeod, Georgetown (CA); John Alexander Larsen, Toronto (CA); Felix Leung, Toronto (CA); Karl Joseph Borst, Woodbridge (CA)

(73) Assignee: GANZ, Woodbridge, Ontario ( * ) Notice: Subject to any disclaimer, the term of this patent is extended or adjusted under 35 U.S.C. 154(b) by 552 days.

(21) Appl. No.: 13/091,627

(22) Filed: Apr. 21, 2011

(65) Prior Publication Data

US 2011/0265044 A1    Oct. 27, 2011

Related U.S. Application Data

(60) Provisional application No. 61/327,346, filed on Apr. 23, 2010.

(51) Int. Cl.
*G06F 3/048*   (2013.01)
*A63F 13/30*   (2014.01)
*G06F 3/0482*  (2013.01)
*G06F 3/0481*  (2013.01)
*G06F 3/0488*  (2013.01)

(52) U.S. Cl.
CPC ............... *A63F 13/12* (2013.01); *G06F 3/0482* (2013.01); *G06F 3/04815* (2013.01); *G06F 3/0488* (2013.01); *G06F 3/04817* (2013.01); *A63F 2300/303* (2013.01); *A63F 2300/308* (2013.01); *A63F 2300/5553* (2013.01); *A63F 2300/572* (2013.01); *A63F 2300/575* (2013.01); *A63F 2300/8058* (2013.01)

(58) Field of Classification Search
USPC .......................................... 715/834, 757, 835
See application file for complete search history.

(56) References Cited

U.S. PATENT DOCUMENTS

| 5,717,869 | A  | 2/1998  | Moran et al.    |
|-----------|----|---------|-----------------|
| 5,768,382 | A  | 6/1998  | Schneier et al. |
| 5,802,296 | A  | 9/1998  | Morse et al.    |
| 5,880,731 | A  | 3/1999  | Liles et al.    |
| 5,886,697 | A  | 3/1999  | Naughton et al. |
| 5,907,831 | A  | 5/1999  | Lotvin et al.   |
| 5,971,855 | A  | 10/1999 | Ng              |
| 6,022,273 | A  | 2/2000  | Gabai et al.    |
| 6,031,549 | A  | 2/2000  | Hayes-Roth      |
| 6,173,267 | B1 | 1/2001  | Cairns          |
| 6,210,272 | B1 | 4/2001  | Brown           |

(Continued)

FOREIGN PATENT DOCUMENTS

| GB | 2365364    | 2/2002 |
|----|------------|--------|
| JP | 2002063092 | 2/2002 |

(Continued)

OTHER PUBLICATIONS

Culture Formation and its Issues in Personal Agent-oriented Virtual Society—"PAW2"—Matsuda (2002).

(Continued)

*Primary Examiner* — Tuyetlien Tran
(74) *Attorney, Agent, or Firm* — Pearne & Gordon LLP

(57) ABSTRACT

A user interface for a virtual world controls and allows registering new characters and also registering achievement when the user has carried out a number of different items.

14 Claims, 4 Drawing Sheets

(56) References Cited

U.S. PATENT DOCUMENTS

| | | | |
|---|---|---|---|
| 6,219,045 B1 | 4/2001 | Leahy et al. | |
| 6,267,672 B1 | 7/2001 | Vance | |
| 6,273,815 B1 | 8/2001 | Stuckman | |
| 6,388,665 B1 | 5/2002 | Linnett et al. | |
| 6,404,438 B1 | 6/2002 | Hatlelid et al. | |
| 6,435,875 B1 | 8/2002 | Karussi | |
| 6,476,830 B1 | 11/2002 | Farmer et al. | |
| 6,522,333 B1 | 2/2003 | Hatlelid et al. | |
| 6,663,105 B1 | 12/2003 | Sullivan et al. | |
| 6,677,968 B1 | 1/2004 | Appelman | |
| 6,729,884 B1 | 5/2004 | Kelton et al. | |
| 6,758,746 B1 | 7/2004 | Hunter et al. | |
| 6,773,325 B1 | 8/2004 | Mawle et al. | |
| 6,832,955 B2 | 12/2004 | Yokoi | |
| 6,845,486 B2 | 1/2005 | Yamada et al. | |
| 6,890,179 B2 | 5/2005 | Rogan et al. | |
| 6,910,186 B2 | 6/2005 | Kim | |
| 6,951,516 B1 | 10/2005 | Eguchi et al. | |
| 6,954,728 B1 | 10/2005 | Kusumoto et al. | |
| 7,012,602 B2 | 3/2006 | Watson et al. | |
| 7,032,187 B2 | 4/2006 | Keely, Jr. et al. | |
| 7,054,831 B2 | 5/2006 | Koenig | |
| 7,058,897 B2 | 6/2006 | Matsuda | |
| 7,061,493 B1 | 6/2006 | Cook et al. | |
| 7,062,722 B1 | 6/2006 | Carlin et al. | |
| 7,086,005 B1 | 8/2006 | Matsuda | |
| 7,139,796 B2 | 11/2006 | Rekimoto et al. | |
| 7,168,051 B2 | 1/2007 | Robinson et al. | |
| 7,210,104 B2 | 4/2007 | Nakagawa | |
| 7,249,139 B2 | 7/2007 | Chuah et al. | |
| 7,314,407 B1 | 1/2008 | Pearson | |
| 7,342,587 B2 | 3/2008 | Danzig et al. | |
| 7,396,281 B2 | 7/2008 | Mendelsohn et al. | |
| 7,425,169 B2 | 9/2008 | Ganz | |
| 7,442,108 B2 | 10/2008 | Ganz | |
| 7,465,212 B2 | 12/2008 | Ganz | |
| 7,493,558 B2 | 2/2009 | Leahy et al. | |
| 7,534,157 B2 | 5/2009 | Ganz | |
| 7,568,964 B2 | 8/2009 | Ganz | |
| 7,587,338 B2 | 9/2009 | Owa | |
| 7,604,525 B2 | 10/2009 | Ganz | |
| 7,618,303 B2 | 11/2009 | Ganz | |
| 7,677,948 B2 | 3/2010 | Ganz | |
| 7,789,726 B2 | 9/2010 | Ganz | |
| 7,823,074 B2 | 10/2010 | Takemura et al. | |
| 7,846,004 B2 | 12/2010 | Ganz | |
| 7,862,428 B2 | 1/2011 | Borge | |
| 2002/0007313 A1 | 1/2002 | Mai et al. | |
| 2002/0054094 A1 | 5/2002 | Matsuda | |
| 2002/0090985 A1 | 7/2002 | Tochner et al. | |
| 2002/0119810 A1 | 8/2002 | Takatsuka et al. | |
| 2002/0130894 A1 | 9/2002 | Young | |
| 2002/0147640 A1 | 10/2002 | Daniele | |
| 2002/0169668 A1 | 11/2002 | Bank et al. | |
| 2003/0018523 A1 | 1/2003 | Rappaport | |
| 2003/0065721 A1 | 4/2003 | Roskind | |
| 2004/0030595 A1 | 2/2004 | Park et al. | |
| 2004/0043806 A1 | 3/2004 | Kirby | |
| 2004/0075685 A1* | 4/2004 | Ohyama et al. | 345/745 |
| 2004/0093266 A1 | 5/2004 | Dohring | |
| 2004/0189702 A1 | 9/2004 | Hlavac et al. | |
| 2004/0221243 A1 | 11/2004 | Twerdahl et al. | |
| 2004/0242326 A1 | 12/2004 | Fujisawa | |
| 2005/0043076 A1 | 2/2005 | Lin | |
| 2005/0045025 A1* | 3/2005 | Wells et al. | 84/615 |
| 2005/0059483 A1 | 3/2005 | Borge | |
| 2005/0177428 A1 | 8/2005 | Ganz | |
| 2005/0222906 A1 | 10/2005 | Chen | |
| 2005/0229116 A1 | 10/2005 | Endler et al. | |
| 2005/0250415 A1 | 11/2005 | Barthold | |
| 2005/0250416 A1 | 11/2005 | Barthold | |
| 2005/0272497 A1* | 12/2005 | Sterchi et al. | 463/3 |
| 2006/0001645 A1 | 1/2006 | Drucker et al. | |
| 2006/0048064 A1 | 3/2006 | Vronay | |
| 2006/0082068 A1* | 4/2006 | Patchen | 273/430 |
| 2006/0093142 A1 | 5/2006 | Schneier et al. | |
| 2006/0121991 A1* | 6/2006 | Borinik et al. | 463/43 |
| 2006/0160594 A1 | 7/2006 | Brase | |
| 2006/0172787 A1 | 8/2006 | Ellis et al. | |
| 2006/0224971 A1 | 10/2006 | Paulin et al. | |
| 2006/0242234 A1 | 10/2006 | Counts et al. | |
| 2006/0271433 A1 | 11/2006 | Hughes | |
| 2006/0285441 A1 | 12/2006 | Walker et al. | |
| 2006/0293103 A1 | 12/2006 | Mendelsohn | |
| 2007/0033107 A1 | 2/2007 | Ubale et al. | |
| 2007/0050716 A1 | 3/2007 | Leahy et al. | |
| 2007/0073582 A1 | 3/2007 | Jung et al. | |
| 2007/0082720 A1 | 4/2007 | Bradbury | |
| 2007/0088656 A1 | 4/2007 | Jung et al. | |
| 2007/0099685 A1 | 5/2007 | Van Luchene | |
| 2007/0111770 A1 | 5/2007 | Van Luchene | |
| 2007/0111787 A1* | 5/2007 | Adams et al. | 463/30 |
| 2007/0112624 A1 | 5/2007 | Jung et al. | |
| 2007/0124673 A1 | 5/2007 | Trotto et al. | |
| 2007/0130001 A1 | 6/2007 | Jung et al. | |
| 2007/0130150 A1* | 6/2007 | Fowler et al. | 707/10 |
| 2007/0173323 A1* | 7/2007 | Johnson et al. | 463/42 |
| 2007/0173327 A1* | 7/2007 | Kilgore et al. | 463/42 |
| 2007/0226062 A1 | 9/2007 | Hughes et al. | |
| 2008/0009350 A1 | 1/2008 | Ganz | |
| 2008/0009351 A1 | 1/2008 | Ganz | |
| 2008/0077595 A1 | 3/2008 | Leebow | |
| 2008/0109313 A1 | 5/2008 | Ganz | |
| 2008/0113789 A1* | 5/2008 | Canessa et al. | 463/29 |
| 2008/0113809 A1* | 5/2008 | David et al. | 463/42 |
| 2008/0115087 A1 | 5/2008 | Rollin et al. | |
| 2008/0122796 A1 | 5/2008 | Jobs et al. | |
| 2008/0134099 A1 | 6/2008 | Ganz | |
| 2008/0139265 A1 | 6/2008 | Hardin et al. | |
| 2008/0163055 A1 | 7/2008 | Ganz | |
| 2008/0215973 A1 | 9/2008 | Zalewski et al. | |
| 2008/0221998 A1* | 9/2008 | Mendelsohn et al. | 705/14 |
| 2008/0222295 A1 | 9/2008 | Robinson et al. | |
| 2008/0280684 A1 | 11/2008 | McBride et al. | |
| 2009/0018910 A1* | 1/2009 | Jung et al. | 705/14 |
| 2009/0029772 A1 | 1/2009 | Ganz | |
| 2009/0053970 A1 | 2/2009 | Borge | |
| 2009/0054155 A1 | 2/2009 | Borge | |
| 2009/0055749 A1 | 2/2009 | Chatterjee et al. | |
| 2009/0063282 A1 | 3/2009 | Ganz | |
| 2009/0069084 A1 | 3/2009 | Reece et al. | |
| 2009/0082101 A1* | 3/2009 | Ostergren et al. | 463/31 |
| 2009/0125819 A1 | 5/2009 | Hamilton, II et al. | |
| 2009/0131164 A1 | 5/2009 | Ganz | |
| 2009/0144638 A1 | 6/2009 | Haggar et al. | |
| 2009/0191968 A1 | 7/2009 | Johnson et al. | |
| 2009/0204420 A1 | 8/2009 | Ganz | |
| 2009/0217211 A1 | 8/2009 | Hildreth et al. | |
| 2009/0221367 A1 | 9/2009 | Longley et al. | |
| 2009/0253517 A1 | 10/2009 | Bererton et al. | |
| 2009/0254843 A1 | 10/2009 | Van Wie et al. | |
| 2009/0286604 A1* | 11/2009 | Clowes et al. | 463/42 |
| 2009/0303175 A1 | 12/2009 | Koivunen | |
| 2009/0305772 A1* | 12/2009 | Melendez | 463/23 |
| 2009/0307620 A1 | 12/2009 | Hamilton, II et al. | |
| 2009/0313084 A1 | 12/2009 | Chugh | |
| 2009/0319609 A1* | 12/2009 | Ferraro | 709/204 |
| 2010/0105484 A1 | 4/2010 | Horneff et al. | |
| 2010/0134484 A1 | 6/2010 | Chen et al. | |
| 2010/0151940 A1 | 6/2010 | Borge | |
| 2010/0151948 A1 | 6/2010 | Vance et al. | |
| 2010/0174593 A1 | 7/2010 | Cao et al. | |
| 2010/0210333 A1 | 8/2010 | Halash | |
| 2010/0227682 A1* | 9/2010 | Reville et al. | 463/29 |
| 2010/0280919 A1* | 11/2010 | Everett et al. | 705/27 |
| 2010/0280965 A1 | 11/2010 | Vesterinen et al. | |
| 2010/0306671 A1 | 12/2010 | Mattingly et al. | |
| 2010/0306702 A1 | 12/2010 | Warner | |
| 2011/0092128 A1 | 4/2011 | Ganz | |
| 2011/0092280 A1* | 4/2011 | Koyama et al. | 463/29 |
| 2011/0171934 A1 | 7/2011 | Lim et al. | |
| 2011/0179180 A1 | 7/2011 | Schleifer et al. | |
| 2011/0207525 A1* | 8/2011 | Allen et al. | 463/25 |

(56) References Cited

U.S. PATENT DOCUMENTS

FOREIGN PATENT DOCUMENTS

| WO | 99/42917 | A2 | 8/1999 |
| WO | 01/33327 | A1 | 5/2001 |
| WO | 2006/128224 | A1 | 12/2006 |

OTHER PUBLICATIONS

Evaluation of Personal Agent-Oriented Virtual Society—PAW (matsuda@arch.sony.co.jp) (2001).
IGN—complete guide to Pokemon Blue and Red (2006).
Intl Search Report—PCT-CA2009-000271 dated Sep. 7, 2010.
Grace, "Web Site Tycoon's Next Goal: Sixth Grade"; Woonsocket Call, Jun. 19, 2002.
http://web.archive.org.web.20031202190119/www.monopets.com/, Dec. 2, 2003.
Real-Money Trade of Virtual Assets: Ten Different User Perceptions—Lehdonvirta (2005).
Virtual Economics: Applying Economics to the Study of Game Worlds—Lehdonvirta (2005).
World of Warcraft Manual (2004).
DinoKids <http://www.dinokids.com>—accessed on Aug. 31, 2009.
PlanetCazmo <http://www.planetcazmo.com>—accessed on Oct. 5, 2009.
Littlest Pet Shop Online <http://www.lpso.com/play.aspx>—accessed on Mar. 26, 2010.
F.A.M.P.S. <http://www.myfamps.com>—accessed on Dec. 14, 2009.
Dora Links <http://www.doralinks.com>—accessed on Oct. 31, 2009.
Skoodles <http://www.skoodlez.com>—accessed on Oct. 29, 2008.
Tamagotchi Tamatown <http://www.tamatown.com>—accessed on Sep. 26, 2009.
BioWare Corp, "NeverWinter Nights Platinum", 2004.

\* cited by examiner

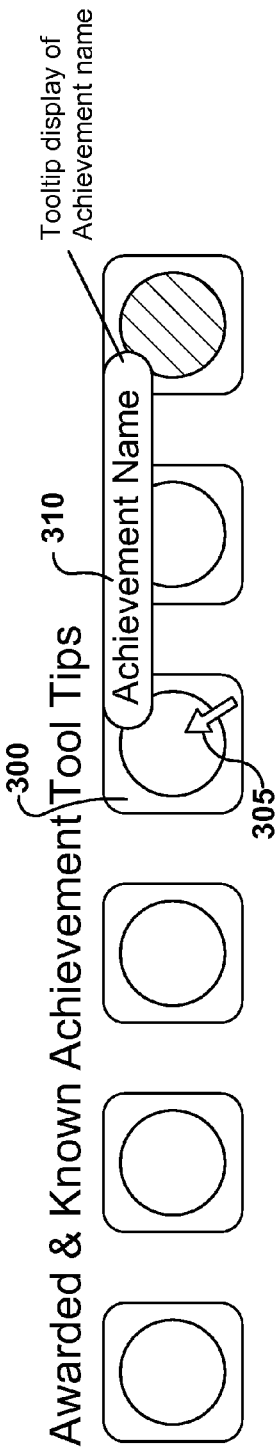
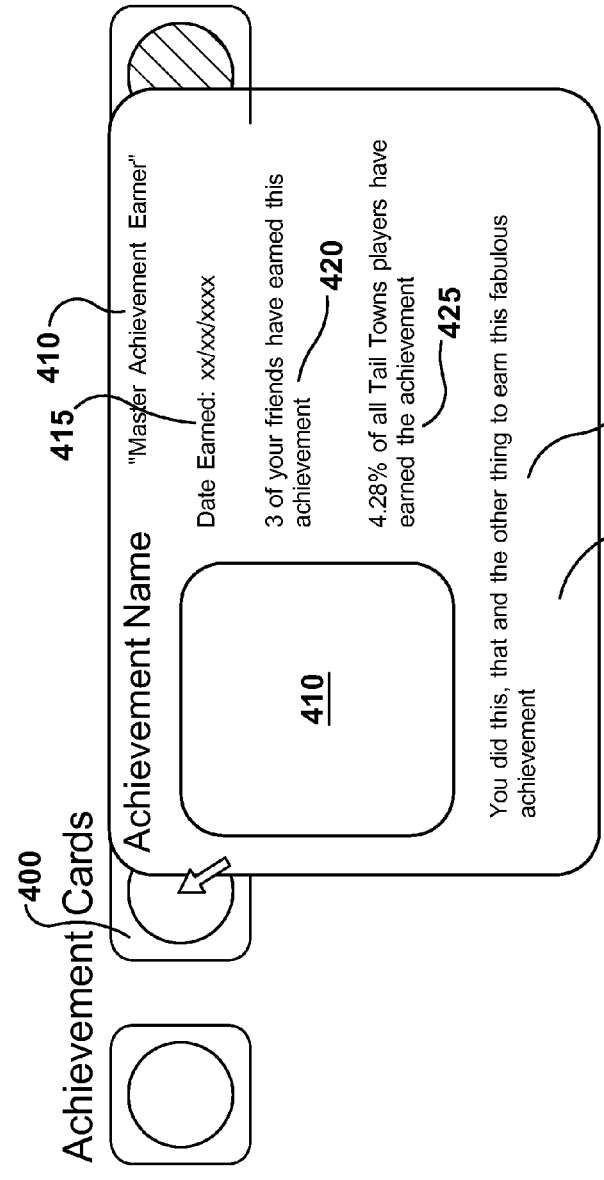

ACHIEVEMENTS FOR A VIRTUAL WORLD GAME

This application claims priority from provisional application No. 61/327,346, filed Apr. 23, 2010, the entire contents of which are herewith incorporated by reference.

BACKGROUND

U.S. Pat. No. 7,425,169, filed Dec. 30, 2004 describes a system of interacting with a virtual representation of a real world product. According to this system, a user can buy a toy or item which is associated with a special code. The toy exists in the real world, and the code forms a key to the virtual world. The user enters the code on a website and enters the virtual world.

The virtual world 110 provides activities and views with which the user can interact. The virtual world, as part of the interaction, provides a virtual replica 115 of the actual toy 100. Users can carry out various activities on the website using their virtual version of the toy. For example, the user can form a house with rooms, furniture, clothing, and other items. The user can also carry out activities to earn cash, and purchase virtual items using that cash.

SUMMARY

According to an embodiment, a computer, provides output information in a form to be displayed on a display screen, said output information including virtual world information indicative of a virtual world with which a user can interact, said computer controlling registering a number of different virtual characters with which the user can interact in the virtual world, and where said virtual characters can be traded with other users in the virtual world for other virtual characters and/or virtual cash, said computer also maintaining information about actions taken by a user, comparing said actions to a sequence of actions that is necessary to obtain and achievement icon, and providing said user with said achievement icon when said user has carried out all of said sequence of actions, and displaying said achievement icon on at least one user information page in the virtual world.

BRIEF DESCRIPTION OF THE DRAWINGS

In the drawings:

FIG. 3 shows tooltips on the achievement icons;

FIG. 4 shows achievement parts on the achievement icons; and

DETAILED DESCRIPTION

Figure 1:
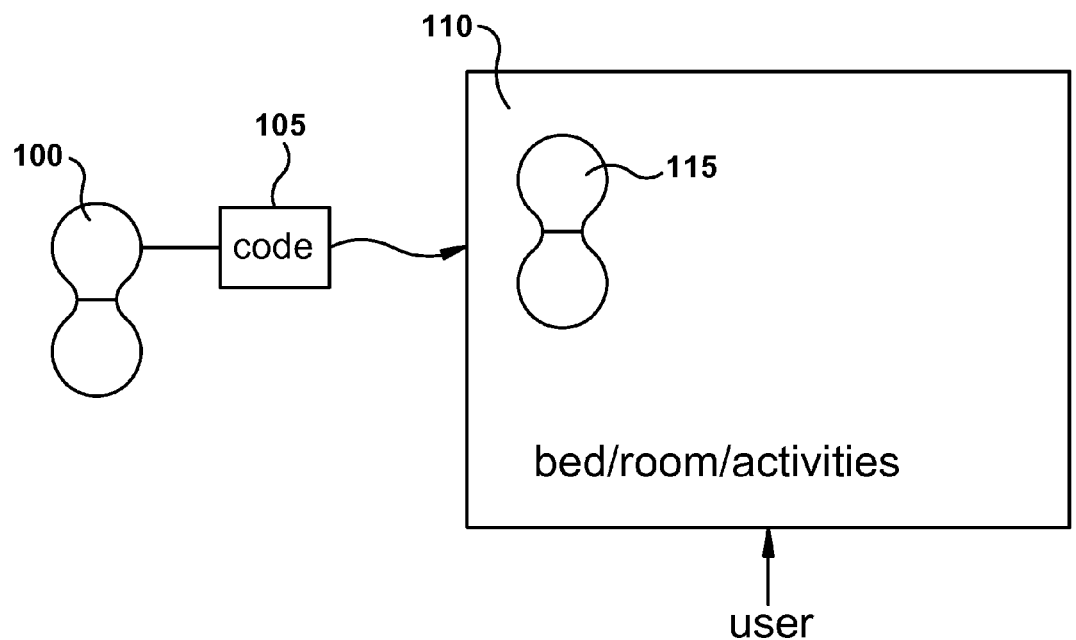
FIG. 1 shows the basic layout of operation in the virtual world.

The present application describes additional aspects, actions and activities and additional structure, for adding to a website of the type described in U.S. Pat. No. 7,421,569 and as shown generally in FIG. 1. It should be understood, however, that the aspects described herein are not limited to use with the system described in FIG. 1. These aspects can be used with other kinds of websites and/or games; for example, any website that allows user interaction can be used with this system. An embodiment describes new operations using the website illustrated in FIG. 1.

In an embodiment, and in websites such as the Webkinz® website, users carry out activities to earn virtual cash that is usable on the website. The virtual cash can be used to purchase items that are usable on the website, e.g., virtual food, furniture, virtual clothing or other items.

The embodiments describe special user interface sets that allow user/player access to many different features in a simplified manner, and that shows user information for a selected item in the virtual world while providing options for controlling that item.

Achievements are intangible rewards to mark accomplishments in the Tail Towns™ virtual world. Achievements are a type of collectible, and can also be used in some cases as a measure of the player's progress. In an embodiment, the player is represented by a villager that is an avatar associated with the player. These achievements are attached to the player's account. Unlike collectable items that can be traded and/or sold, achievements are personal, and according to an embodiment, they cannot be transferred or sold.

The inventors have found that achievements build the players' attachment to the virtual world/game. By way of their villagers' achievements, players are given a sense of accomplishment, and are able to reflect on and review what they have succeeded at in the game. This helps remind them of the "fun" in the game, which helps prolong their investment in the game.

Achievements also provide short and long term goals for players without unbalancing the game. These goals drive the collector and achiever types of players, which again creates a deeper attachment to the game.

Figure 2:
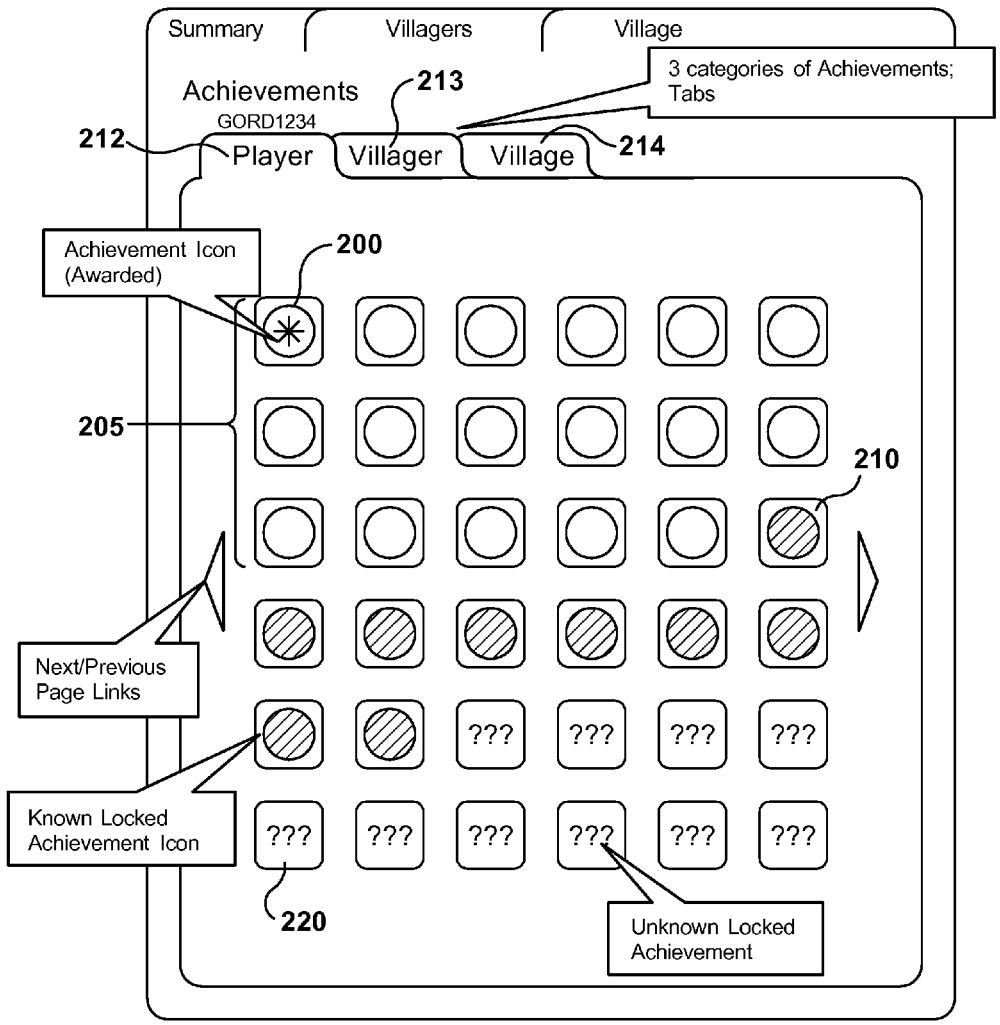
FIG. 2 shows the different ways of handling the achievement icons on a user interface.

Achievements are rewards that mark accomplishments in a social environment or game (e.g., Tail Towns™). FIG. 2 shows a player's profile page, and shows how icons representing the achievements are stored and displayed. Each Achievement has a unique system name and is representative of a different task set having been completed defined according to its condition/trigger. In particular, an achievement has a listing of condition(s) that the player via his villager must accomplish before triggering and earning the achievement reward.

Each achievement has an achievement title, which is the published name of the achievement. This title can be displayed over a villager's head on her public profile, e.g. beneath her name and/or nickname in a smaller font (FIG. 4).

A simple graphical (2D) icon 200 can represent each achievement. FIG. 2 shows the achievement inventory that can be associated with a game or social environment. Each achievement icon can be unique or representative of the type of achievement. The area 205 shows the achievement icons which have been awarded to a player, which are shown in a first specified way (e.g., use of color or shading or image on the icon to distinguish between different status of displayed achievements).

There can be different types of achievement: those associated with a player, villager, or with the village itself. The inventory in FIG. 2 shows different tabs for the player 212, villager 213 (e.g., a player can own multiple villagers) and village 214. Each achievement is displayed under an appropriate tab. There are also other achievement types such as "known locked achievement" icons 210 as well as "unknown locked achievement" icons 220. A known locked achievement is one that has yet to be earned, but the player is aware of the achievement and the conditions which must be satisfied to earn the achievement. The unknown locked achievements 220 are kept secret from the player until the player satisfies the criteria and earns them.

In different embodiments, the player may know that she is working towards receiving an unknown achievement, even though she may be unaware as to which of her actions will result in obtaining the achievement.

Some unknown locked achievements can transform into known locked achievements (before they are fully awarded) after a previous achievement is earned. For example, once a player meets a Novice Quester criteria (e.g., completes 10 quests) to earn the Novice Quester achievement, the next achievement, a Veteran Quester achievement, changes from unknown to known. Once the player completes the criteria for Veteran Quester, the user is awarded the achievement.

Known achievements are unambiguously marked on the player's profile achievement pane as soon as they have been initiated. For example, a "Sunflower Collector" achievement requires the player to collect 20 sunflowers. As soon as the player collects his first sunflower, the achievement appears as one of the known locked icons such as 210, is grayed out (to indicate that it has not yet been earned), and shows its corresponding achievement card (see FIG. 4 below) upon rollover of the icon. The achievement card includes the name of the achievement, a list of conditions for attaining the achievement as well as the player's progress towards meeting the conditions: "Sunflower Collector. Collect 20 Sunflowers. $\frac{1}{20}$"

Each Achievement has a hidden "tag" associated with it. The achievement tags are: gamer, collector, crafter, socialite, or some other tags. The game may use these tags to classify the lifestyle of the player who receives these achievement tags.

In an embodiment, the achievements are automatically awarded when the player meets the criteria. They may be associated with the sound effects such as "Zing-zing-zing!" In addition, there can also be a system message that is delivered and displayed in a villager's chat history. This can also cause a trigger animation of the villager, such as causing the villager to jump up excitedly or causing a sparkle effect in the air.

If the achievement has a related reward item, the player receives an in-game mail notification which indicates that she has received this reward item.

According to one embodiment, a player can only earn each achievement once. Even if the user meets the criteria again, the achievement (and corresponding reward item) will not be awarded again.

FIG. 3 illustrates the information that is revealed when rolling over an achievement icon 300 with a cursor or mouse. The achievement name 310 is displayed.

As mentioned above, FIG. 4 demonstrates that hovering the cursor over a known achievement icon 400 displays its associated achievement card 405. The achievement card 405 includes a special achievement badge 410 which may include or consist of the achievement icon image and/or some other graphical description of the achievement. Unknown achievement icons do not display achievement cards until they become known.

At least some achievements have titles, which are awarded once a particular achievement is earned. A title can be given to a player after a particular achievement is earned or after a collection of achievements have been earned. For example, a player that earns his first 5 achievements may be given the title Master Achievement Earner. For individual achievements that come with a title, the title 410 is specific to the achievement earned. According to an embodiment, a player can assign any of her achievement titles to any of her villagers. There are no restrictions to this, and the player might assign a different title to each villager; the same title to each villager; mix and match; or keep some (or all) villagers without titles. Titles are displayed whenever the villager's name is displayed.

The date earned 415 is also shown. 420 shows the number of the player's friends that have also earned the same achievement. 425 provides other statistics such as the percentage of all players who have earned this achievement. 430 explains the activities or actions that were completed to earn the achievement.

Figure 5:
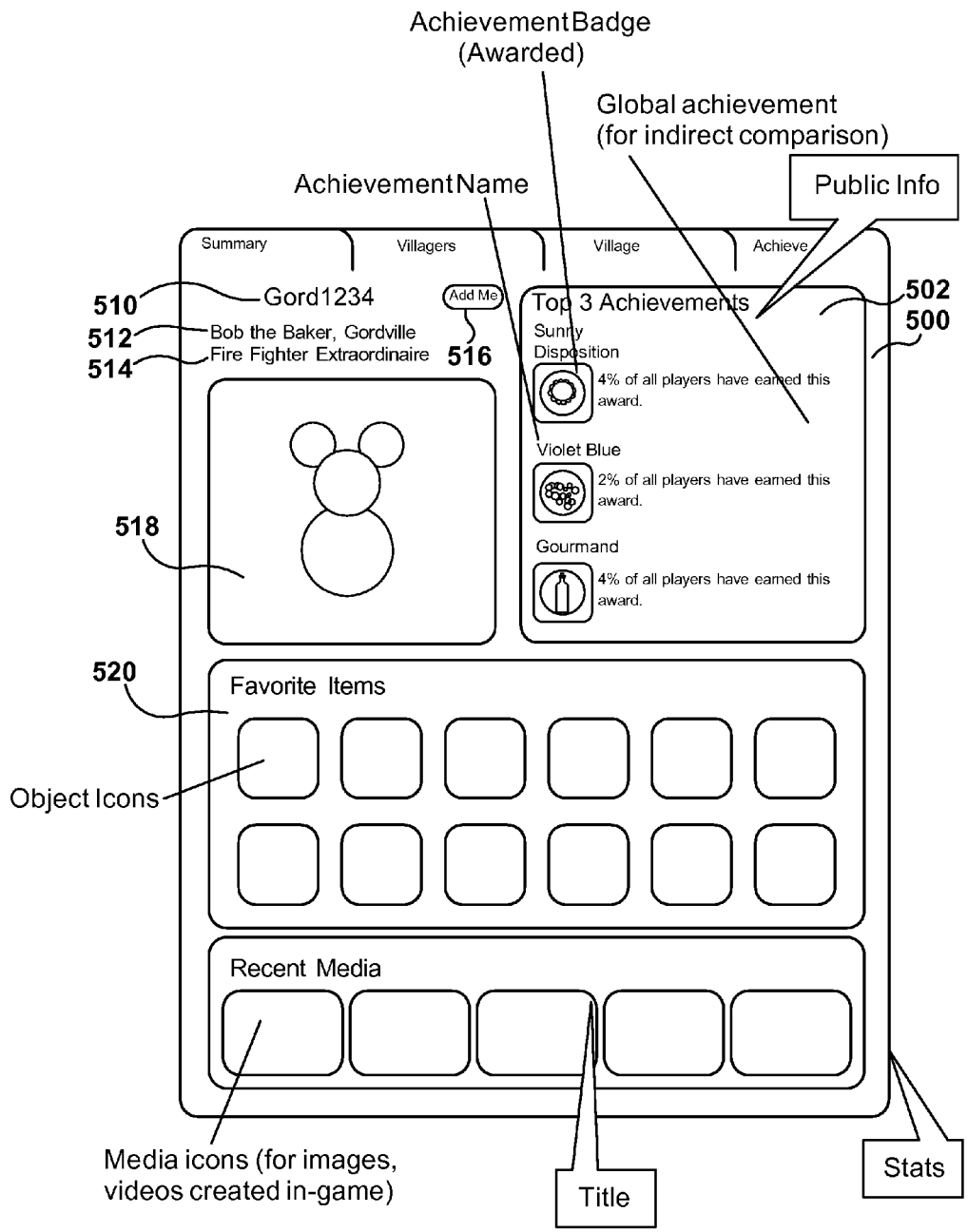
FIG. 5 shows the public profile and shows how the public profile includes the achievements.

FIG. 5 illustrates the public profile of a user and illustrates the different ways in which a user can display his achievements. The public profile 500 may include a top three achievements page 502, where the user can select the achievement badges that she is most proud of. For each of the top three achievements shown, the representative icon, title of the achievement, and global statistics are available to view by a spectator. In this embodiment, they do not show the conditions needed to earn that achievement. For a complete list, players can display all of their achievements on their personal web pages in the social environment.

The public profile 500 can also show a user's username 510, villager name 512, and the villager title 514. It also includes an "add-a-friend" icon 516 which requests that the user be added as a friend. It provides a 3-D view of the player's current villager 518 (e.g., active villager), and also provides a number of object icons representing the user's favorite items 520.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other kinds of items can be maintained as items in the achievements, besides the specific items described herein.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A system comprising:
   a computer, providing output information in a form to be displayed on a display screen, said output information including virtual world information indicative of a virtual world with which a user can interact, said computer controlling registering a number of different virtual characters with which the user can interact in the virtual world, said computer also maintaining information about actions taken by the user, comparing said actions to a sequence of actions that is necessary to obtain an achievement icon, and providing said user with said achievement icon when said user has carried out all of said sequence of actions, and displaying achievement icon information on at least one user information page in the virtual world, where said user information page shows first achievement icons that have been awarded, second achievement icons that have not been awarded but where actions to obtain the achievement award are known, and third achievement icons that have not been awarded but where actions to obtain the achievement award are not known; and
   where said first achievement icons that have been awarded are shown in a first way, said second achievement icons that have not been awarded but are known are shown in a second way that is distinguishable from the first way, and said third achievement icons that have not been awarded and are not known are shown in the third way different than the first and second ways, wherein said achievement icon that has been awarded includes an achievement card which shows a level of achievement of the user, a numerical count of a number of the user's friends who have earned the same achievement, and said sequence of actions which were taken to earn the achievement.

2. A system as in claim 1, wherein said achievement card also shows a total percentage of all participants in the virtual world who have earned the achievement.

3. A system as in claim 1, wherein said page of achievement icons shows achievement icons that cannot yet be obtained by a user.

4. A system as in claim 3, wherein said page of achievement icons also shows achievement icons that have been started but have not yet been awarded, because the user has not completed the entire sequence of actions but where the user has completed some part of said sequence of actions.

5. A system as in claim 4, wherein said page of achievement icons also shows other achievement icons which have not been started, and where the user is not given information about what will be necessary to complete the other achievement Icons.

6. A system as in claim 1, wherein said virtual characters can be traded in the virtual world, but said achievement icons cannot be traded in the virtual world.

7. A system as in claim 1, wherein said achievement icon is awarded when the user has collected a specified number of virtual objects in the virtual world.

8. A method comprising:
   sending from a server computer system to a client computer over a network, output information in a form to be displayed on a display screen, said output information including virtual world information indicative of a virtual world with which a user can interact;
   registering, in the server computer system, a number of different virtual characters with which the user can interact in the virtual world;
   maintaining information about actions taken by the user in the virtual world in the server computer system;
   comparing said actions to a sequence of actions that is necessary to obtain an achievement icon; and
   providing said user with said achievement icon as part of said output information when said user has carried out all of said sequence of actions, and displaying said achievement icon on at least one user information page in the virtual world, and where said user information page shows first achievement icons that have been awarded, second achievement icons that have not been awarded but where actions to obtain the achievement award are known, and third achievement icons that have not been awarded but where actions to obtain the achievement award are not known; and where said first achievement icons that have been awarded are shown in a first way, said second achievement icons that have not been awarded but are known are shown in a second way that is distinguishable from the first way, and said third achievement icons that have not been awarded and are not known are shown in the third way different than the first and second way, wherein said achievement icon that has been awarded includes an achievement card which shows a level of achievement of the user, a numerical count of a number of the user's friends who have earned the same achievement, and said sequence of actions which were taken to earn the achievement.

9. A method as in claim 8, wherein said achievement card also shows a total percentage of all participants in the virtual world who have earned the achievement.

10. A method as in claim 8, wherein said page of achievement icons shows achievement icons that cannot yet be obtained by a user.

11. A method as in claim 10, wherein said page of achievement icons also shows achievement icons that have been started but have not yet been awarded, because the user has not completed the entire sequence of actions but where the user has completed some part of said sequence of actions.

12. A method as in claim 11, wherein said page of achievement icons also shows other achievement icons which have not been started, and where the user is not given information about what will be necessary to complete the other achievement icons.

13. A method as in claim 8, further comprising allowing said virtual characters to be traded in the virtual world, but preventing said first achievement icons from being traded in the virtual world.

14. A method as in claim 8, wherein said achievement icon is awarded when the user has collected a specified number of virtual objects in the virtual world.

* * * * *